United States Patent
Wagner et al.

(10) Patent No.: US 10,808,119 B2
(45) Date of Patent: Oct. 20, 2020

(54) FLAME-RETARDANT POLYESTERS

(71) Applicant: BASF SE, Ludwigshafen (DE)

(72) Inventors: Sebastian Wagner, Ludwigshafen (DE); Roland Helmut Krämer, Mannheim (DE); Alexander König, Bruchsal (DE); Michael Roth, Lautertal (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 14/917,039

(22) PCT Filed: Aug. 15, 2014

(86) PCT No.: PCT/EP2014/067508
§ 371 (c)(1),
(2) Date: Mar. 7, 2016

(87) PCT Pub. No.: WO2015/032607
PCT Pub. Date: Mar. 12, 2015

(65) Prior Publication Data
US 2016/0200911 A1    Jul. 14, 2016

(30) Foreign Application Priority Data

Sep. 9, 2013 (EP) .................................... 13183487

(51) Int. Cl.
| | | |
|---|---|---|
| C08L 67/02 | (2006.01) | |
| C08K 3/22 | (2006.01) | |
| C08K 5/098 | (2006.01) | |
| C08K 5/00 | (2006.01) | |
| C08L 33/16 | (2006.01) | |
| C08J 5/18 | (2006.01) | |
| D01F 1/07 | (2006.01) | |
| D01F 6/62 | (2006.01) | |

(52) U.S. Cl.
CPC ............... *C08L 67/02* (2013.01); *C08J 5/18* (2013.01); *C08K 3/2279* (2013.01); *C08K 5/0066* (2013.01); *C08K 5/098* (2013.01); *C08L 33/16* (2013.01); *C08J 2367/02* (2013.01); *C08K 3/22* (2013.01); *D01F 1/07* (2013.01); *D01F 6/62* (2013.01); *Y02P 20/582* (2015.11)

(58) Field of Classification Search
CPC ... C08L 67/02; C08L 33/16; C08J 5/18; C08J 2367/02; C08K 3/2279; C08K 5/0066; C08K 5/098; C08K 3/22; Y02P 20/582; D01F 1/07; D01F 6/62; D01F 1/22
USPC ................. 524/399, 400, 394, 398
See application file for complete search history.

(56) References Cited

U.S. PATENT DOCUMENTS

| | | | |
|---|---|---|---|
| 3,354,191 A | 11/1967 | Stivers | |
| 5,665,832 A | 9/1997 | Magerstedt et al. | |
| 5,990,213 A | 11/1999 | Kobayashi | |
| 7,105,589 B2* | 9/2006 | Geprags | C08K 3/2279 524/411 |
| 2005/0004277 A1 | 1/2005 | Hoerold et al. | |

FOREIGN PATENT DOCUMENTS

| | | | | |
|---|---|---|---|---|
| EP | 0 624 626 A1 | 11/1994 | | |
| EP | 0 774490 A2 | 5/1997 | | |
| EP | 1 477 520 A2 | 11/2004 | | |
| GB | 1061371 A * | 3/1967 | ............ | C07C 63/70 |
| JP | 49082731 A * | 8/1974 | | |
| JP | S4982731 A | 8/1974 | | |
| JP | 2005232410 A * | 9/2005 | | |
| WO | WO 0036013 A2 * | 6/2000 | ............ | C08L 67/02 |
| WO | WO-2013/085789 A1 | 6/2013 | | |

OTHER PUBLICATIONS

WO 00/036013 A2 (2000), machine translation, Google Patents.*
JP 49-082731 A, machine translation, JPO Japan Platform for Patent Information (J-PlatPat). (Year: 1974).*
JP 2005232410 A, machine translation, EPO espacenet. (Year: 2005).*
International Search Report in International Patent Application No. PCT/EP2014/067508, dated Nov. 24, 2014.
Japanese Patent Application No. 2016-541859, Translation of the Notification of Reasons for Refusal, dated Apr. 16, 2018.
"Purastikku_Tenkazai_Katsuyo_Noto", (Plastic additives application note), Motonobu Minagawa, Kogyo Chosakai Publishing Co., Ltd. First edition, Second printing, p. 93 (Feb. 15, 1998).

* cited by examiner

*Primary Examiner* — Josephine L Chang
(74) *Attorney, Agent, or Firm* — Marshall, Gerstein & Borun LLP

(57) ABSTRACT

The disclosure is directed to a thermoplastic molding composition. The composition includes A) from 10 to 98% by weight of a thermoplastic polyester; B) from 0.5 to 30% by weight of a dicarboxylic salt; C) from 1 to 30% by weight of a flame retardant combination made of C1) a halogen-containing flame retardant differing from B), and C2) an antimony oxide; and D) from 0 to 50% by weight of other additives. The total of the percentages by weight of components A) to D) is 100%. The dicarboxylic salt is represented by the following formula, where $R^1$ to $R^4$ are mutually independently halogen or hydrogen, wherein at least one moiety $R^1$ to $R^4$ is halogen, x is 1 to 3, m is 1 to 9, n is 2 to 3, and M is an alkaline earth metal, Ni, Ce, Fe, In, Ga, Al, Pb, Y, Zn, or Hg:

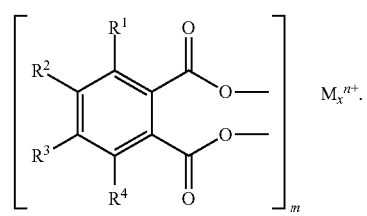

11 Claims, No Drawings

FLAME-RETARDANT POLYESTERS

CROSS-REFERENCE TO RELATED APPLICATIONS

This is the U.S. national phase of International Application No. PCT/EP2014/067508, filed Aug. 15, 2014, which claims the benefit of European Patent application No. 13183487.1, filed Sep. 9, 2013.

1. Thermoplastic molding compositions comprising
A) from 10 to 98% by weight of a thermoplastic polyester
B) from 0.5 to 30% by weight of a dicarboxylic salt of the formula

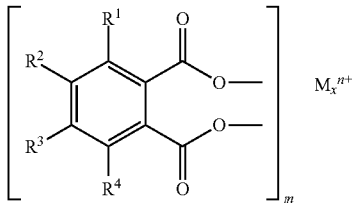

where $R^1$ to $R^4$ are mutually independently halogen or hydrogen, with the proviso that at least one moiety $R^1$ to $R^4$ is halogen,
x=from 1 to 3
m=from 1 to 9
n=from 2 to 3
M=alkaline earth metal, Ni, Ce, Fe, In, Ga, Al, Pb, Y, Zn, Hg
C) from 1 to 30% by weight of a flame retardant combination made of
  C1) a halogen-containing flame retardant differing from B)
  C2) an antimony oxide
D) from 0 to 50% by weight of other additives,
where the total of the percentages by weight of components A) to D) is 100%.

The invention further relates to the use of the thermoplastic molding compositions for the production of flame-retardant moldings of any type and to the resultant moldings.

Thermoplastic polyesters are materials with a long history of use. Properties that are attaining increasing importance, alongside the mechanical, thermal, electrical and chemical properties of these materials are those such as flame retardancy and high glow-wire resistance. Examples of applications here are those in the household-products sector (e.g. plugs) and in the electronics sector (e.g. protective covers for circuit breakers).

Halogen-containing flame retardants and combinations with other flame retardants are known by way of example from EP-A 1477520 or WO2013/085789.

U.S. Pat. No. 3,354,191 discloses halogenated phthalic salts which are used in HIPS (high-impact polystyrene). However, adequate flame retardancy in these halogenated systems can be achieved only with a synergist comprising antimony, and the amounts used are very high. This has a disadvantageous effect on mechanical and electrical properties.

It was therefore an object of the present invention, starting from the prior art described above, to provide flame-retardant polyester molding compositions with high flame retardancy (low afterflame time) and with good LOI values.

Accordingly, the molding compositions defined in the introduction have been found. Preferred embodiments are available in the dependent claims.

The molding compositions of the invention comprise, as component A), from 10 to 98% by weight, preferably from 35 to 95% by weight and in particular from 35 to 80% by weight, of at least one thermoplastic polyester.

Use is generally made of polyesters (A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$-$C_4$-alkyl groups, such as methyl, ethyl, iso- or n-propyl, or n-, iso- or tert-butyl groups.

These polyalkylene terephthalates may be produced by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The intrinsic viscosity of the polyesters (A) is generally in the range from 50 to 220, preferably from 80 to 160 (measured in 0.5% strength by weight solution in a phenol/o-dichlorobenzene mixture in a ratio by weight of 1:1 at 25° C. in accordance with ISO 1628). Particular preference is given to polyesters whose carboxy end group content is up to 100 meq/kg of polyester, preferably up to 50 meq/kg of polyester and in particular up to 40 meq/kg of polyester. Polyesters of this type may be produced, for example, by the process of DE-A 44 01 055. The carboxy end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use PET recyclates (also termed scrap PET), optionally mixed with polyalkylene terephthalates, such as PBT.

Recyclates are generally:
1) that known as post-industrial recyclate: these materials are production wastes arising during polycondensation or during processing, e.g. sprues from injection molding, start-up material from injection molding or extrusion, or edge trims from extruded sheets or films.
2) post-consumer recyclate: these materials are plastics items which are collected and treated after use by the end consumer. Blow-molded PET bottles for mineral water, soft drinks and juices are easily the predominant items in terms of quantity.

Both types of recyclate may be used either in the form of regrind or in the form of pelletized materials. In the latter case, the crude recyclates are separated and purified and then melted and pelletized using an extruder. This usually facilitates handling and free flow, and metering for further steps in processing.

The recyclates used may either be pelletized or in the form of regrind. The edge length should not be more than 10 mm, preferably less than 8 mm.

Because polyesters undergo hydrolytic cleavage during processing (due to traces of moisture) it is advisable to predry the recyclate. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are composed of from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the general formula

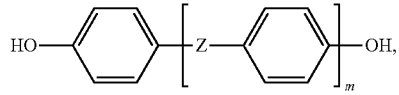

where Z is an alkylene or cycloalkylene group having up to 8 carbon atoms, an arylene group having up to 12 carbon atoms, a carbonyl group, a sulfonyl group, an oxygen atom or a sulfur atom, or a chemical bond, and where m is from 0 to 2. The phenylene groups of the compounds may also have substitution by $C_1$-$C_6$-alkyl or alkoxy groups, and fluorine, chlorine or bromine.

Examples of parent compounds for these compounds are
dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene,
resorcinol, and hydroquinone, and also the ring-alkylated and ring-halogenated derivatives of these.

Among these, preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone, and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, the term polyesters also includes halogen-free polycarbonates. Examples of suitable halogen-free polycarbonates are those based on diphenols of the general formula

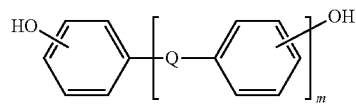

where Q is a single bond, a $C_1$-$C_8$-alkylene group, a $C_2$-$C_3$-alkylidene group, a $C_3$-$C_6$-cycloalkylidene group, a $C_6$-$C_{12}$-arylene group, or —O—, —S— or —SO$_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A), and preference is given to the copolycarbonates of bisphenol A, as well as to bisphenol A homopolymer.

Suitable polycarbonates may be branched in a known manner, specifically and preferably by incorporating 0.05 to 2.0 mol %, based on the total of the diphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to average molar masses $M_w$ (weight-average) of from 10 000 to 200 000 g/mol, preferably from 20 000 to 80 000 g/mol.

The diphenols of the general formula are known per se or can be produced by known processes.

The polycarbonates may, for example, be produced by reacting the diphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.)

Examples of suitable chain terminators are phenol, p-tert-butylphenol, or else long-chain alkylphenols, such as 4-(1, 3-tetramethylbutyl)phenol as in DE-A 28 42 005, or monoalkylphenols, or dialkylphenols with a total of from 8 to 20 carbon atoms in the alkyl substituents as in DE-A 35 06 472, such as p-nonylphenyl, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates composed of halogen-free diphenols, of halogen-free chain terminators and optionally of halogen-free branching agents, where the content of subordinate amounts at the ppm level of hydrolyzable chlorine, resulting, for example, from the production of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the production process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

The molding compositions of the invention comprise, as component B) from 0.5 to 30% by weight, preferably from 1 to 25% by weight, and in particular from 5 to 25% by weight, based on A) to D), of a dicarboxylic salt of the formula

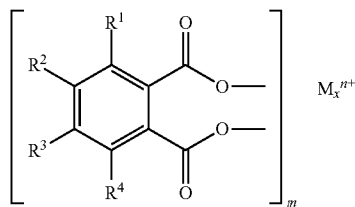

where
$R^1$ to $R^4$ are mutually independently halogen or hydrogen, with the proviso that at least one moiety $R^1$ to $R^4$ is halogen,
x=from 1 to 3, preferably 1 or 2
m=from 1 to 9, preferably from 1 to 3, 6 or 9, in particular from 1 to 3
n=from 2 to 3
M=alkaline earth metal, Ni, Ce, Fe, In, Ga, Al, Pb, Y, Zn, Hg.

Preferred dicarboxylic salts D) comprise, as moieties $R^1$ to $R^4$, mutually independently, Cl or bromine or hydrogen, and with particular preference all of the moieties $R^1$ to $R^4$ are Cl or/and Br.

Preferred metals M are Be, Mg, Ca, Sr, Ba, Al, Zn, Fe.

Dicarboxylic salts of this type are obtainable commercially or can be produced according to the processes described in U.S. Pat. No. 3,354,191.

The molding compositions of the invention comprise, as component C), from 1 to 30% by weight, preferably from 2 to 25% by weight, and in particular from 5 to 20% by weight, of a flame retardant combination made of C1) from 20 to 99% by weight, preferably from 50 to 85% by weight, of a halogen-containing flame retardant differing from B)

C2) from 1 to 80% by weight, preferably from 15 to 50% by weight, of an antimony oxide.

Preferred oxides C2) are antimony trioxide and/or antimony pentoxide and/or sodium antimonite. In order to improve dispersion, it is possible to incorporate the oxide C2) in what are known as masterbatches (concentrates) into the polymer A), where polymers that can be used in the concentrate are by way of example those which correspond to or differ from component A). Preference is given to concentrates of C2) in polyolefins or in polyesters, preferably polybutylene terephthalate or polyethylene.

Suitable flame retardants C1) are preferably brominated compounds such as, brominated diphenyl ethers, brominated trimethylphenylindanes (FR 1808 from DSB), tetrabromobisphenol A, and hexabromocyclododecane, differing from B).

Suitable flame retardants C1) are preferably brominated compounds such as brominated oligocarbonates (BC 52 or BC 58 from Great Lakes) of the following structural formula:

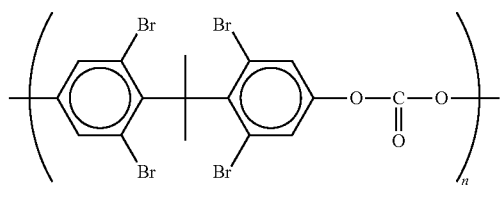

n < 3

Particularly suitable compounds are polypentabromobenzyl acrylates where n>4 (e.g. FR 1025 from ICL-IP) of the formula:

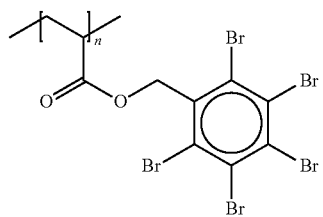

Other preferred brominated compounds are oligomeric reaction products (n>3) of tetrabromobisphenol A with epoxides (e.g. FR 2300 and 2400 from DSB) of the formula:

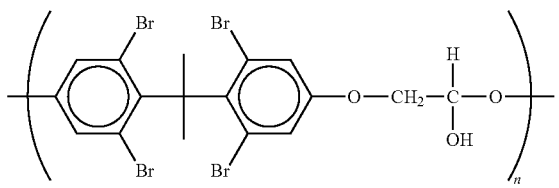

The brominated oligostyrenes preferably used as flame retardants have an average degree of polymerization (number average) of from 3 to 90, preferably from 5 to 60, measured by vapor pressure osmometry in toluene. Cyclic oligomers are equally suitable. According to one preferred embodiment of the invention, the brominated oligomeric styrenes to be used have the formula I below, in which R is hydrogen or an aliphatic moiety, in particular an alkyl moiety, such as, for example, $CH_2$ or $C_2H_5$ and n is the number of the repeating chain units. R' can be either H or else bromine or else a fragment of a conventional free-radical generator:

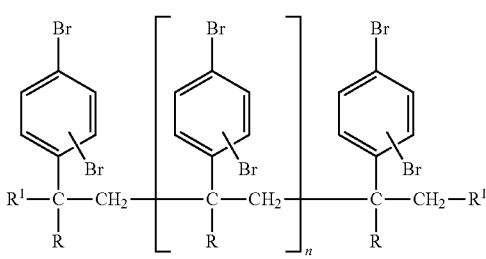
(I)

The value n can be from 1 to 88, preferably from 3 to 58. The brominated oligostyrenes comprise from 40 to 80% by weight, preferably from 55 to 70% by weight of bromine. Preference is given to a product composed mainly of polydibromostyrene. The substances can be melted without decomposition and are by way of example soluble in tetrahydrofuran. They can be produced either by ring bromination of—optionally aliphatically hydrogenated—styrene oligomers of the type that are obtained by way of example by thermal polymerization of styrene (according to DT-OS 25 37 385) or by free-radical oligomerization of suitable brominated styrenes. The flame retardant can also be produced by ionic oligomerization of styrene and subsequent bromination. The amount of brominated oligostyrene needed to provide flame retardancy to the polyamides depends on the bromine content. The bromine content in the molding compositions of the invention is from 2 to 30% by weight, preferably from 5 to 12% by weight.

The brominated polystyrenes of the invention are usually obtained by the process described in EP-A 47 549:

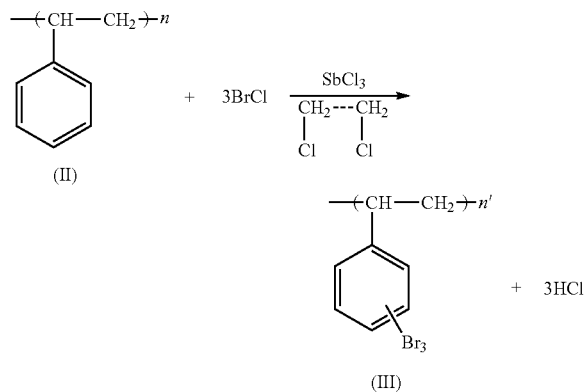

The brominated polystyrenes obtainable by said process and commercially are mainly ring-substituted tribrominated products. n' (see III) generally has values of from 125 to 1 500, corresponding to a molecular weight of from 42 500 to 235 000, preferably from 130 000 to 135 000.

Bromine content (based on the content of ring-substituted bromine) is generally at least 50% by weight, preferably at least 60% by weight and in particular 65% by weight.

The pulverulent products obtainable commercially generally have a glass transition temperature of from 160 to 200° C. and are obtainable by way of example as HP 7010 from Albemarle and Pyrocheck PB 68) from Ferro Corporation.

It is also possible to use mixtures of the brominated oligostyrenes with brominated polystyrenes in the molding compositions of the invention where the mixing ratio is as desired.

Chlorine-containing flame retardants C1) are also suitable, preference being given here to Declorane plus from Oxychem.

The molding compositions of the invention can comprise, as component D), from 0 to 50% by weight, in particular up to 45% by weight, of other additives and processing aids.

Examples of conventional additives D) are amounts of up to 40% by weight, preferably up to 15% by weight, of elastomeric polymers (often also termed impact modifiers, elastomers or rubbers).

Very generally, these are copolymers which are preferably composed of at least two of the following monomers: ethylene, propylene, butadiene, isobutene, isoprene, chloroprene, vinyl acetate, styrene, acrylonitrile, and acrylic or methacrylic esters having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, U K, 1977).

Some preferred types of these elastomers are described below.

Preferred types of elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I, II, III or IV below:

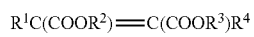 (I)

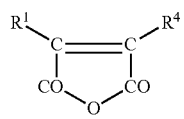 (II)

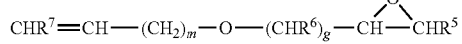 (III)

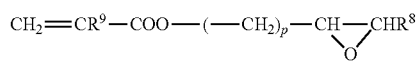 (IV)

where $R^1$ to $R^9$ are hydrogen or alkyl groups having from 1 to 6 carbon atoms, and m is a whole number from 0 to 20, g is a whole number from 0 to 10, and p is a whole number from 0 to 5.

It is preferable that the moieties $R^1$ to $R^9$ are hydrogen, where m is 0 or 1 and g is 1. The corresponding compounds are maleic acid, fumaric acid, maleic anhydride, allyl glycidyl ether, and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers of
from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid, and/or maleic anhydride, and
from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters. Comonomers which may also be used alongside these are vinyl esters and vinyl ethers.

The ethylene copolymers described above may be produced by processes known per se, preferably by random copolymerization at high pressure and elevated temperature. Appropriate processes are well known.

Other preferred elastomers are emulsion polymers whose production is described, for example, by Blackley in the monograph "Emulsion polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the production of the rubber fraction of the elastomers are acrylates, such as, for example, n-butyl acrylate and 2-ethylhexyl acrylate, corresponding methacrylates, butadiene and isoprene, and also mixtures of these. These monomers may be copolymerized with other monomers, such as, for example, styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally produced by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers here.

It has proven advantageous in some cases to use emulsion polymers which have reactive groups at the surface. Examples of groups of this type are epoxy, carboxy, latent carboxy, amino and amide groups, and also functional groups which may be introduced by concomitant use of monomers of the general formula

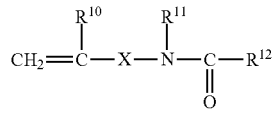

where the substituents may be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group or —$OR^{13}$
$R^{13}$ is a $C_1$-$C_8$-alkyl group or $C_6$-$C_{12}$-aryl group, optionally with substitution by O— or N—comprising groups,
X is a chemical bond, a $C_1$-$C_{10}$-alkylene group or $C_6$-$C_{12}$-arylene group, or

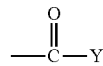

Y is O—Z or NH—Z, and
Z is a $C_1$-$C_{10}$-alkylene group or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|------|----------------------|---------------------------|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

These graft polymers, in particular ABS polymers and/or ASA polymers, are preferably used in amounts of up to 40% by weight for the impact-modification of PBT optionally in a mixture with up to 40% by weight of polyethylene terephthalate. Blend products of this type are obtainable with the trademark Ultradur®S (previously Ultrablend®S from BASF AG).

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be produced by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described can also be produced by other conventional processes, e.g. by suspension polymerization.

Preference is given equally to silicone rubbers as described in DE-A 37 25 576, EP-A 235 690, DE-A 38 00 603, and EP-A 319 290.

It is also possible, of course, to use mixtures of the types of rubber listed above.

Fibrous or particulate fillers D) that may be mentioned are glass fibers, glass beads, amorphous silica, asbestos, calcium silicate, calcium metasilicate, magnesium carbonate, kaolin, chalk, quartz powder, mica, barium sulfate and feldspar. Amounts used of fibrous fillers D) are up to 50% by weight, in particular up to 35% by weight, and amounts used of particulate fillers are up to 30% by weight, in particular up to 10% by weight.

Preferred fibrous fillers that may be mentioned are aramid fibers and potassium titanate fibers, and particular preference is given here to glass fibers in the form of E glass. These can be used in the form of rovings or of chopped glass in the forms available commercially.

Amounts used of laser-absorbent fillers, such as, for example, carbon fibers, carbon black, graphite, graphene or carbon nanotubes, are preferably below 1% by weight, particularly preferably below 0.05% by weight.

In order to improve compatibility with the thermoplastic, the fibrous fillers can have been surface-pretreated with a silane compound.

Suitable silane compounds are those of the general formula

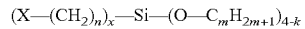

in which the definitions of the substituents are as follows:

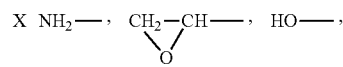

n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane. and also the corresponding silanes which comprise a glycidyl group as substituent X.

The amounts generally used of the silane compounds for surface coating are from 0.05 to 5% by weight, preferably from 0.1 to 1.5% by weight, and in particular from 0.2 to 0.5% by weight (based on D).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not absolutely essential.

As component D), the thermoplastic molding compositions of the invention may comprise the usual processing aids, such as stabilizers, oxidation retarders, agents to counteract decomposition due to heat and decomposition due to ultraviolet light, lubricants and mold-release agents, colorants, such as dyes and pigments, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants that can be added are inorganic and organic pigments, and also dyes, for example nigrosin and anthraquinones. EP 1722984 B1, EP 1353986 B1, or DE 10054859 A1 by way of example mention particularly suitable colorants.

Preference is further given to esters or amides of saturated or unsaturated aliphatic carboxylic acids having from 10 to 40, preferably from 16 to 22, carbon atoms with saturated aliphatic alcohols or amines which comprise from 2 to 40, preferably from 2 to 6, carbon atoms.

The carboxylic acids can be mono- or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given to glycerol and pentaerythritol.

The aliphatic amines can be mono- to tribasic. Examples of these are stearylamine, ethylenediamine, propylenediamine, hexamethylenediamine, and di(6-aminohexyl)amine, particular preference being given here to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use mixtures of various esters or amides, or esters with amides in combination, in any desired mixing ratio.

The amounts usually used of other lubricants and mold-release agents are up to 1% by weight. Preference is given to long-chain fatty acids (e.g. stearic acid or behenic acid), salts of these (e.g. Ca stearate or Zn stearate), or montan waxes (mixtures of straight-chain, saturated carboxylic acids having chain lengths of from 28 to 32 carbon atoms), Ca montanate or Na montanate, and also low-molecular-weight polyethylene waxes and low-molecular-weight polypropylene waxes.

Examples that may be mentioned of plasticizers are dioctyl phthalate, dibenzyl phthalate, butyl benzyl phthalate, hydrocarbon oils, and N-(n-butyl)benzenesulfonamide.

The molding compositions of the invention can also comprise from 0 to 2% by weight of fluorine-containing ethylene polymers. These are polymers of ethylene having from 55 to 76% by weight fluorine content, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers" (Wiley Interscience, 1972).

These fluorine-comprising ethylene polymers have homogeneous distribution in the molding compositions and preferably have a particle size $d_{50}$ (numeric average) in the range from 0.05 to 10 μm, in particular from 0.1 to 5 μm. These small particle sizes can particularly preferably be achieved by the use of aqueous dispersions of fluorine-comprising ethylene polymers and the incorporation of these into a polyester melt.

The thermoplastic molding compositions of the invention can be produced by processes known per se, by mixing the starting components in conventional mixing apparatuses such as screw-based extruders, Brabender mixers, or Banbury mixers, and then extruding same. The extrudate can be cooled and comminuted. It is also possible to pre-mix individual components (an example being application, in a drum or otherwise, of individual components to the pelletized material), and then to add the remaining starting materials individually, and/or likewise in the form of a mixture. The mixing temperatures are generally from 230 to 290° C. Component B) can preferably also be added by the hot-feed method or directly to the extruder intake.

In another preferred procedure, components B) and C), and also optionally D), can be mixed with a polyester prepolymer, compounded, and pelletized. The resultant pelletized material is then subjected to continuous or batchwise solid-phase condensation at a temperature below the melting point of component A) under inert gas until the desired viscosity has been reached.

The molding compositions of the invention feature good electrical and flame-retardancy properties.

The moldings produced from the molding compositions of the invention are used for the production of internal and external parts, preferably with load-bearing or mechanical function in any of the following sectors: electrical, furniture, sports, mechanical engineering, sanitary and hygiene, medical, power engineering and drive technology, automobile and other means of transport, or housing material for equipment and apparatuses for telecommunications, consumer electronics, household devices, mechanical engineering, the heating sector or fastening parts for installation work, or for containers and ventilation parts of any type.

These materials are suitable for the production of fibers, foils and moldings of any type, in particular for applications as plugs, switches, housing parts, housing covers, headlamp (bezels), shower heads, fittings, smoothing irons, rotary switches, stove controls, fryer lids, door handles, (rear) mirror housings, (tailgate) screen wipers, sheathing for optical conductors.

Devices which can be produced with the polyesters of the invention in the electrical and electronics sector are: plugs, plug parts, plug connectors, cable-harness components, circuit mounts, circuit mount components, three-dimensionally injection-molded circuit mounts, electrical connector elements, mechatronic components, and optoelectronic components.

Possible uses in automobile interiors are for dashboards, steering-column switches, seat parts, headrests, center consoles, gearbox components, and door modules, and possible uses in automobile exteriors are door handles, headlamp components, exterior mirror components, windshield wiper components, windshield wiper protective housings, decorative grilles, roof rails, roof frames and exterior bodywork parts.

Possible uses of the polyesters in the kitchen and household sector are: production of components for kitchen equipment, e.g. fryers, smoothing irons, buttons, and also garden and leisure sector applications, e.g. components for irrigation systems or garden equipment.

EXAMPLES

Component A

Polybutylene terephthalate with intrinsic viscosity IV 130 ml/g and with terminal carboxy group content of 34 meq/kg (Ultradur® B 4500 from BASF SE) (IV measured in 0.5% by weight solution of phenol/o-dichlorobenzene, 1:1 mixture at 25° C. in accordance with DIN 53728/ISO).

Component B/1

Tetrabromophthal aluminate (CAS: 13654-74-5)
[$Al_2(TBrPA)_3$] or ⅔ Al $C_5H_2Br_4O_4$ Component B/2

Zinc salt of tetrabromophthalic acid ("TBrPA") (CAS: 13654-76-7)
[$ZnC_8H_2Br_4O_4$]

Component B/3

Calcium salt of TBrPA (CAS: 13899-13-3)
[$CaC_8H_2Br_4O_4$]

Component B/4

Iron salt of TBrPA (CAS: 13810-83-8)
⅔ $Fe.C_8Br_4O_4H_2$ or [$Fe_2(TBrPA)_3$]

Component C/1

Polypentabromobenzyl acrylate where n>4 (e.g. FR 1025 from ICL-IP)
(CAS: 59447-57-3)
of the formula:

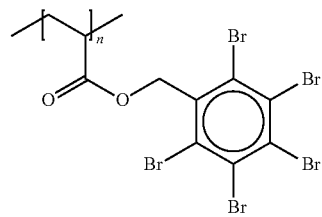

Component C/2

$Sb_2O_3$ (90% masterbatch in polyethylene)

Component D

Standard chopped glass fiber for polyester with average thickness 10 μm.

Production of the Molding Compositions/Test Specimens

Appropriate plastics molding compositions were manufactured by compounding. For this, the individual components were mixed in an extruder at about 250-270° C. with a flat temperature profile, extruded in the form of strands, cooled until pelletizable, and pelletized. The test specimens were injection-molded at a melt temperature of about 260° C. and a mold temperature of about 80° C. in an Arburg 420C injection-molding machine.

LOI was determined in accordance with ISO 4589-2, and fire class was determined in accordance with UL 94 (1.6 mm), and CTI was measured in accordance with IEC 60112: specimen thickness 3 mm, original surface without specific conditioning. Measurements were made at 400 V.

Char yield (TGA) was measured in a TGA Q5000 instrument from TA Instruments. In each case the input weight was from 4.5 to 5 mg. Measurements were made at 10° C./min under nitrogen. The purge rate was 65 ml/min. The residue (char yield) was determined at 600° C.

The constitutions of the molding compositions and the results of the measurements can be found in the tables.

| Component [% by wt.] | Comp./1 | Comp./2 | Comp./3 | Comp./4 | Comp./5 | Comp./6 | Comp./7 | Comp./8 | Comp./9 |
|---|---|---|---|---|---|---|---|---|---|
| A | 66 | 66 | 56 | 66 | 56 | 66 | 56 | 66 | 56 |
| B/1 |  | 10 | 10 |  |  |  |  |  |  |
| B/2 |  |  |  | 10 | 10 |  |  |  |  |
| B/3 |  |  |  |  |  | 10 | 10 |  |  |
| B/4 |  |  |  |  |  |  |  | 10 | 10 |
| C/1 | 8 |  | 10 |  | 10 |  | 10 |  | 10 |
| C/2 | 2 |  |  |  |  |  |  |  |  |
| D | 24 | 24 | 24 | 24 | 24 | 24 | 24 | 24 | 24 |
| Char yield (TGA (N2)) | not measured | not measured | 30.2 | not measured | 28.9 | not measured | 30.6 | not measured | 33.3 |
| Total of the afterflame time | 45 s | <250 s | 80 s | <250 s | 75 s | <250 s | 89 s | <250 s | 75 s |
| LOI (2 specimens) | not measured | not measured | <25 | not measured | <25 | not measured | <25 | not measured | 25.8 |
| UL 94 1.6 mm | V-2 | not measured | V-2 | not measured | V-2 | not measured | V-2 | not measured | V-2 |

|   | 1 | 2 | 3 | 4 |
|---|---|---|---|---|
| A | 58 | 58 | 58 | 58 |
| B/1 | 8 | | | |
| B/2 | | 8 | | |
| B/3 | | | 8 | |
| B/4 | | | | 8 |
| C/1 | 8 | 8 | 8 | 8 |
| C/2 | 2 | 2 | 2 | 2 |
| D | 24 | 24 | 24 | 24 |
| Char yield (TGA (N2)) | 30.5 | 33.5 | 29.8 | 33.2 |
| Total of the afterflame time | 34 s | 37 s | 40 s | 45 s |
| LOI (2 specimens) | 30.8 | 29.5 | 30.5 | 28.5 |
| UL 94 1.6 mm | V-0 | V-0 | V-0 | V-0 |

Formulations Comp. 1 to Comp. 9 mostly reveal, for a total FR loading of from 10 to 20% by weight, V-2 classification and an LOI value below 26. In contrast thereto, formulations 1-4 of the invention reveal, for a constant loading of 18% by weight, a stable V-0 classification with markedly increased LOI.

The invention claimed is:

1. A thermoplastic molding composition comprising
A) from 35 to 80% by weight of a thermoplastic polyester polybutylene terephthalate,
B) from 5 to 25% by weight of a dicarboxylic salt selected from the group consisting of a zinc salt of tetrabromophthalic acid, an iron salt of tetrabromophthalic acid, tetrabromophthal aluminate, and combinations thereof
C) from 5 to 20% by weight of a flame retardant combination made of
C1) from 50 to 85% by weight relative to component C) of a polypentabromobenzyl acrylate according to the following formula in which n>4:

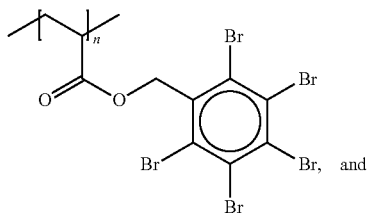

C2) from 15 to 50% by weight relative to component C) of an antimony oxide comprising $Sb_2O_3$, sodium antimonite, or a mixture of these,
D) glass fibers, which are present in the thermoplastic molding composition and have a concentration up to 35% by weight, and optionally other additives, the combined amount of the glass fibers and any optional other additives present being up to 50% by weight,
wherein:
the total of the percentages by weight of components A) to D) is 100%; and
the thermoplastic molding composition is free from nigrosins.

2. The thermoplastic molding composition according to claim 1, wherein:
component A) is present in an amount from 58 to 80% by weight,
component B) is present in an amount from 5 to 8% by weight, and
component C) is present in an amount from 5 to 10% by weight.

3. The thermoplastic molding composition according to claim 2, wherein the glass fibers are present in an amount from 10 to 35% by weight.

4. The thermoplastic molding composition according to claim 1, wherein the thermoplastic molding composition is free from $Sb_2O_5$.

5. The thermoplastic molding composition according to claim 4, wherein the antimony oxide comprises $Sb_2O_3$.

6. A thermoplastic molding composition comprising
A) from 35 to 58% by weight of a thermoplastic polyester polybutylene terephthalate,
B) from 8 to 25% by weight of a dicarboxylic salt selected from the group consisting of a zinc salt of tetrabromophthalic acid, a calcium salt of tetrabromophthalic acid, an iron salt of tetrabromophthalic acid, tetrabromophthal aluminate, and combinations thereof,
C) from 10 to 20% by weight of a flame retardant combination made of
C1) from 50 to 85% by weight relative to component C) of a polypentabromobenzyl acrylate according to the following formula in which n>4:

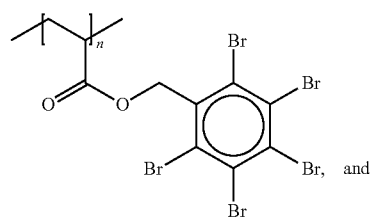

C2) from 15 to 50% by weight relative to component C) of an antimony oxide comprising $Sb_2O_3$, sodium antimonite, or a mixture of these,
D) glass fibers, which are present in the thermoplastic molding composition and have a concentration up to 35% by weight, and optionally other additives, the combined amount of the glass fibers and any optional other additives present being up to 50% by weight,
wherein:
the total of the percentages by weight of components A) to D) is 100%; and
the thermoplastic molding composition is free from nigrosins.

7. The thermoplastic molding composition according to claim 6, wherein the glass fibers are present in an amount from 10 to 35% by weight.

8. The thermoplastic molding composition according to claim 6, wherein the thermoplastic molding composition is free from $Sb_2O_5$.

9. The thermoplastic molding composition according to claim 8, wherein the antimony oxide comprises $Sb_2O_3$.

10. A fiber, foil, or molding obtained from a polyester molding composition according to claim 6.

11. A method of producing fibers, foils, and molding comprising the use of a polyester molding composition according to claim 6.

* * * * *